(12) United States Patent
Xiong

(10) Patent No.: US 12,387,422 B2
(45) Date of Patent: Aug. 12, 2025

(54) METHODS AND DEVICES FOR VIDEO RENDERING FOR VIDEO SEE-THROUGH (VST) AUGMENTED REALITY (AR)

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 18/055,304

(22) Filed: Nov. 14, 2022

(65) Prior Publication Data

US 2023/0419595 A1 Dec. 28, 2023

Related U.S. Application Data

(60) Provisional application No. 63/355,373, filed on Jun. 24, 2022.

(51) Int. Cl.
| | |
|---|---|
| *G06T 15/20* | (2011.01) |
| *G02B 27/01* | (2006.01) |
| *H04N 13/00* | (2018.01) |
| *H04N 13/128* | (2018.01) |
| *H04N 13/156* | (2018.01) |

(52) U.S. Cl.
CPC ........ *G06T 15/205* (2013.01); *G02B 27/0172* (2013.01); *H04N 13/128* (2018.05); *H04N 13/156* (2018.05); *G02B 2027/0138* (2013.01); *H04N 2013/0081* (2013.01)

(58) Field of Classification Search
None
See application file for complete search history.

(56) References Cited

U.S. PATENT DOCUMENTS

| | | |
|---|---|---|
| 10,475,196 B2 | 11/2019 | Price et al. |
| 10,943,358 B2 | 3/2021 | Chen et al. |

(Continued)

OTHER PUBLICATIONS

Masatoshi et al., "Gaze+ : A Stereoscopic Video See-Through Augmented Reality Device With Vergence Control and Gaze Stabilization for Near-Field Applications", Jun. 2016, 7 pages.

(Continued)

*Primary Examiner* — Kyle Zhai

(57) ABSTRACT

A method includes capturing an image and associating the image with a camera pose for each of multiple cameras. The method also includes determining, for each camera, a first contribution of the image for a first virtual view for display on a first display and a second contribution of the image for a second virtual view for display on a second display. The method further includes determining, for each camera, a first confidence map for the first virtual view based on the camera pose and a position of the camera in relation to a first virtual camera and a second confidence map for the second virtual view based on the camera pose and the position of the camera in relation to a second virtual camera. In addition, the method includes generating the first virtual view by combining the first contribution using the first confidence map for each of the cameras and the second virtual view by combining the second contribution using the second confidence map for each of the cameras.

20 Claims, 10 Drawing Sheets

(56) References Cited

U.S. PATENT DOCUMENTS

| | | | |
|---|---|---|---|
| 11,032,530 B1 | 6/2021 | Bleyer et al. | |
| 2019/0304164 A1* | 10/2019 | Zhang | G06T 1/20 |
| 2021/0366142 A1 | 11/2021 | Grossinger et al. | |
| 2022/0148254 A1* | 5/2022 | Sorkine Hornung | H04N 13/117 |

OTHER PUBLICATIONS

Hsieh et al., "Markerless Augmented Reality via Stereo Video See-Through Head-Mounted Display Device", Hindawi Publishing Corporation, Mathematical Problems in Engineering, vol. 2015, Article ID 329415, Sep. 2015, 13 pages.

* cited by examiner

METHODS AND DEVICES FOR VIDEO RENDERING FOR VIDEO SEE-THROUGH (VST) AUGMENTED REALITY (AR)

CROSS-REFERENCE TO RELATED APPLICATION AND PRIORITY CLAIM

This application claims priority under 35 U.S.C. § 119(e) to U.S. Provisional Patent Application No. 63/355,373 filed on Jun. 24, 2022, which is hereby incorporated by reference in its entirety.

TECHNICAL FIELD

This disclosure relates generally to augmented reality (AR) devices and processes. More specifically, this disclosure relates to methods and devices for video rendering for video see-through (VST) AR.

BACKGROUND

Augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

SUMMARY

This disclosure provides methods and devices for video rendering for video see-through (VST) augmented reality (AR).

In a first embodiment, a method for video rendering for VST AR on an AR device includes capturing an image and associating the captured image with a camera pose for each of a plurality of cameras of the AR device. The method also includes determining, for each of the cameras, (i) a first contribution of the captured image for a first virtual view for display on a first display of the AR device and (ii) a second contribution of the captured image for a second virtual view for display on a second display of the AR device. The method further includes determining, for each of the cameras, (i) a first confidence map for the first virtual view based on the camera pose and a position of the camera in relation to a first virtual camera and (ii) a second confidence map for the second virtual view based on the camera pose and the position of the camera in relation to a second virtual camera. In addition, the method includes generating (i) the first virtual view by combining the first contribution using the first confidence map for each of the plurality of cameras and (ii) the second virtual view by combining the second contribution using the second confidence map for each of the plurality of cameras.

In a second embodiment, a VST AR device includes a plurality of cameras and at least one processing device operably coupled to the cameras. The at least one processing device is configured, for each of the cameras, to capture an image using the camera and associate the captured image with a camera pose. The at least one processing device is also configured to determine, for each of the cameras, (i) a first contribution of the captured image for a first virtual view for display on a first display of the AR device and (ii) a second contribution of the captured image for a second virtual view for display on a second display of the AR device. The at least one processing device is further configured to determine, for each of the cameras, (i) a first confidence map for the first virtual view based on the camera pose and a position of the camera in relation to a first virtual camera and (ii) a second confidence map for the second virtual view based on the camera pose and the position of the camera in relation to a second virtual camera. In addition, the at least one processing device is configured to generate (i) the first virtual view by combining the first contribution using the first confidence map for each of the plurality of cameras and (ii) the second virtual view by combining the second contribution using the second confidence map for each of the plurality of cameras.

In a third embodiment, a non-transitory machine readable medium contains instructions that when executed cause at least one processor to capture an image and associate the captured image with a camera pose for each of a plurality of cameras of a VST AR device. The non-transitory machine readable medium also contains instructions that when executed cause the at least one processor to determine, for each of the cameras, (i) a first contribution of the captured image for a first virtual view for display on a first display of the AR device and (ii) a second contribution of the captured image for a second virtual view for display on a second display of the AR device. The non-transitory machine readable medium further contains instructions that when executed cause the at least one processor to determine, for each of the cameras, (i) a first confidence map for the first virtual view based on the camera pose and a position of the camera in relation to a first virtual camera and (ii) a second confidence map for the second virtual view based on the camera pose and the position of the camera in relation to a second virtual camera. In addition, the non-transitory machine readable medium contains instructions that when executed cause the at least one processor to generate (i) the first virtual view by combining the first contribution using the first confidence map for each of the plurality of cameras and (ii) the second virtual view by combining the second contribution using the second confidence map for each of the plurality of cameras.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the descriptions in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, described below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

In contrast to OST AR systems, video see-through (VST) AR systems present users with generated video sequences of real-world scenes. VST AR systems can be built using virtual reality (VR) technologies and can have various advantages over OST AR systems. For example, VST AR systems can provide wider fields of view and can provide improved contextual augmented reality. Compared to OST AR pipelines, a VST AR pipeline can create virtual views from views of real cameras (referred to as "see-through" cameras), which may require substantial computational resources. This disclosure provides methods and devices for video rendering for VST AR. Among other things, these methods and devices can reduce latency of a virtual view creation pipeline, which can enhance user experiences. Moreover, these methods and devices can produce high-quality virtual views, which can be important based on a user's ability to easily compare generated virtual views with real views.

Figure 1:
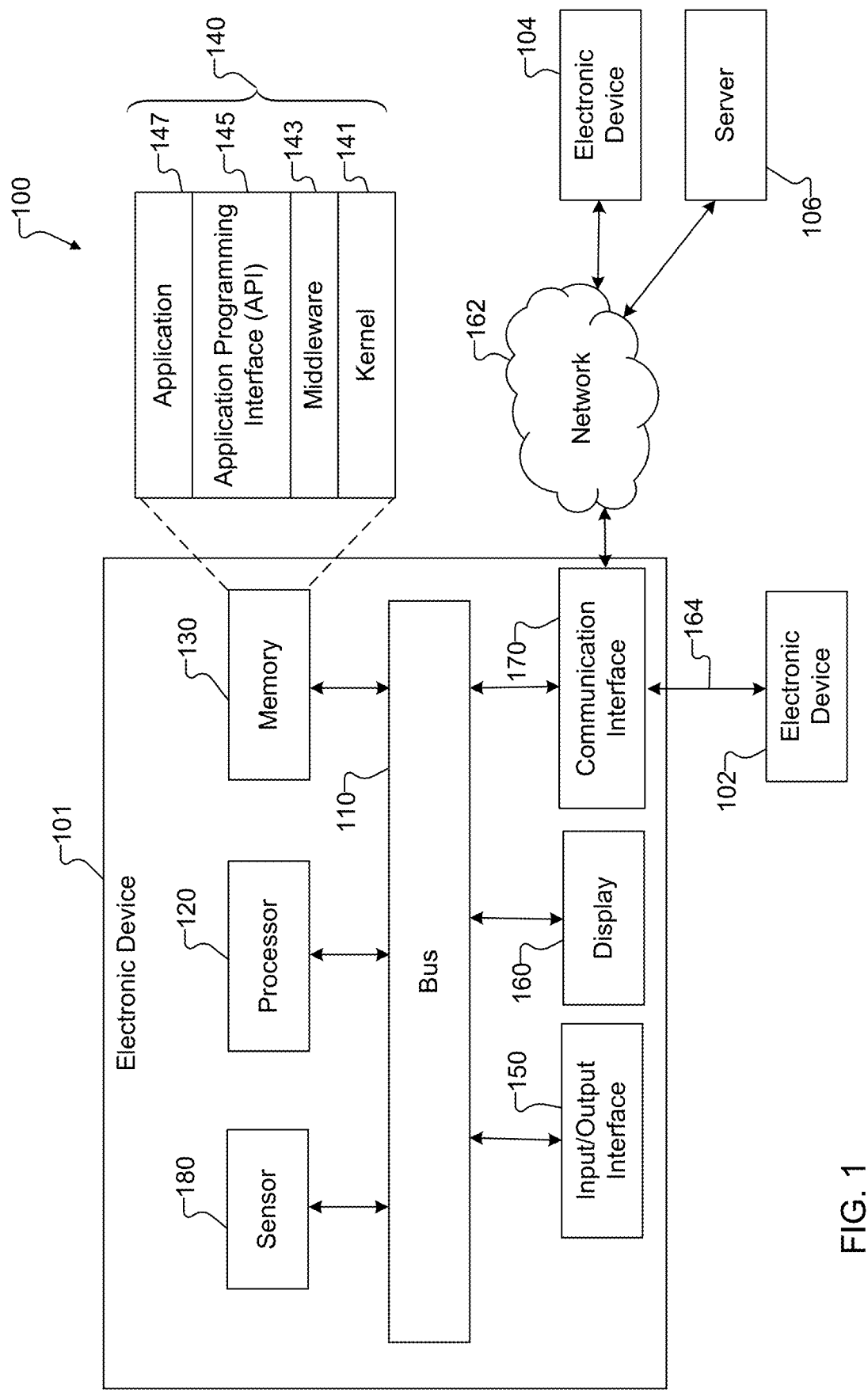
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform one or more functions related to video rendering for VST AR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform one or more functions related to video rendering for VST AR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to video rendering for VST AR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
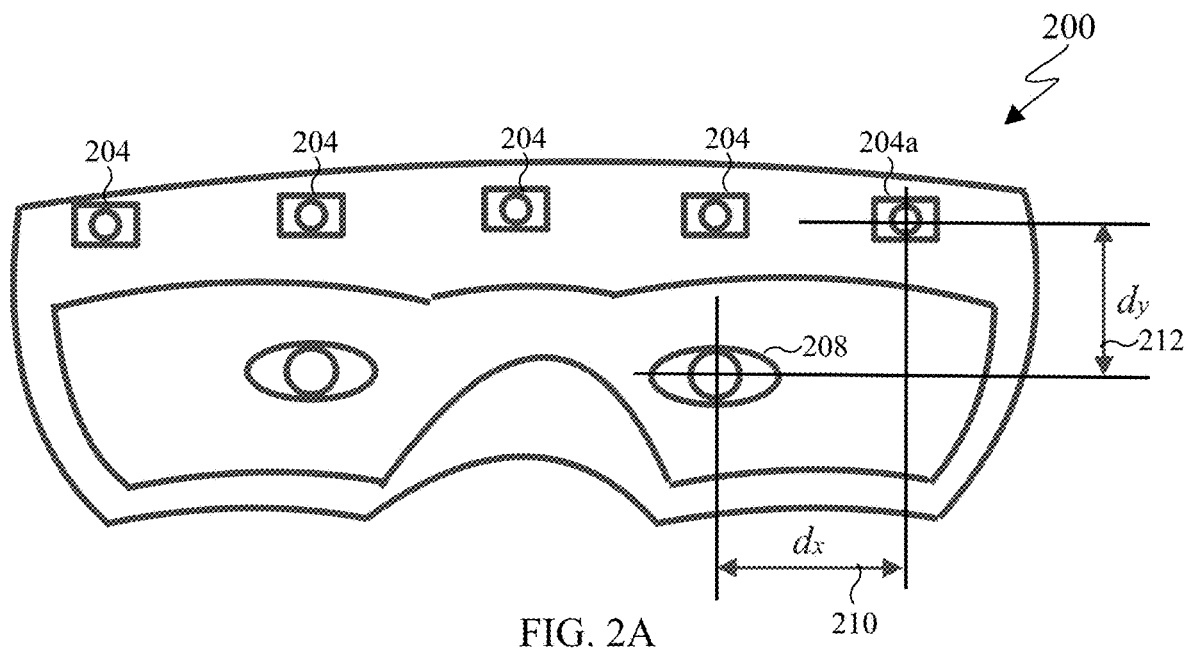
FIGS. 2A and 2B illustrate an example camera configuration on a head mounted device (HMD) for video see-through (VST) augmented reality (AR) in accordance with this disclosure.
Figure 2B:
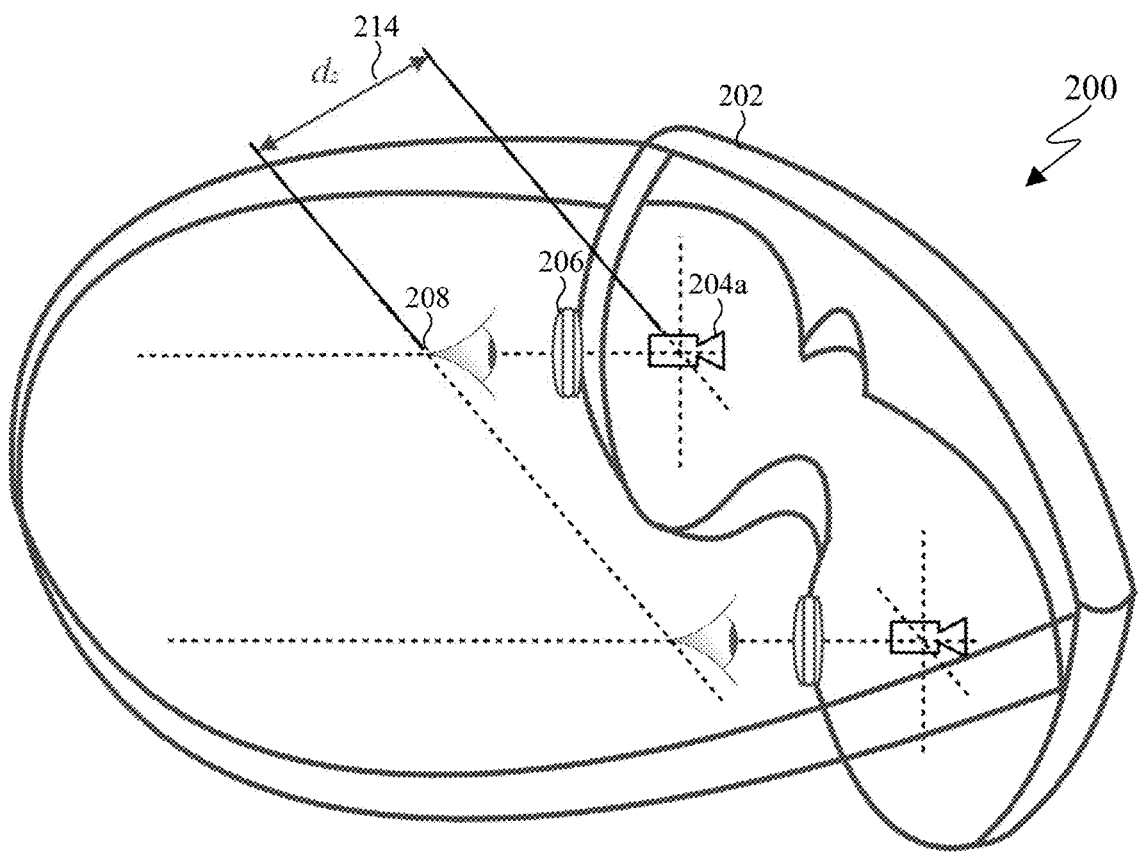

FIGS. 2A and 2B illustrate an example camera configuration 200 on an HMD 202 for VST AR in accordance with this disclosure. For ease of explanation, the HMD 202 may be described as being implemented using the electronic device 101 in the network configuration 100 of FIG. 1. However, the HMD 202 may be used in any other suitable device(s) and in any other suitable system(s).

As shown in FIGS. 2A and 2B, the HMD 202 can be used for VST AR. In this example, the HND 202 can include one or more see-through cameras 204 and at least first and second lenses 206. The HMD 202 can have rendering viewpoints 208 based on locations of the user's eyes when the HMD 202 is worn. Each rendering viewpoint 208 can also correspond to a virtual camera viewpoint for a virtual camera that is discussed later in regard to a virtual camera pose. A virtual camera pose is a pose for a "virtual camera" corresponding to a pose of the user's eye. Each rendering viewpoint 208 can be determined based on measurements taken once a user is wearing the HMD 202 or can have a default standard position (and the user may be able to adjust the lenses 206 or the fit of the HMD 202).

In some cases, the see-through cameras 204 can be arranged on an exterior of the HMD 202. When multiple cameras 204 are present, the cameras 204 can be positioned at different distances and orientations in relation to the eye viewpoints and the rendering viewpoints 208. For example, a first camera 204a can have a distance in the x-direction or horizontal distance 210 from a rendering viewpoint 208, a distance in the y-direction or vertical distance 212 from that rendering viewpoint 208, and a distance in the z-direction or depth 214 from that rendering viewpoint 208.

Although FIGS. 2A and 2B illustrate one example of a camera configuration 200 on an HMD 202 for VST AR, various changes may be made to FIGS. 2A and 2B. For example, an HMD 202 may have any other suitable form factor, and the number and placement of the cameras 204 can vary as needed or desired. Also, the HMD 202 may be used in any other suitable video rendering process and is not limited to the specific processes described above.

Figure 3A:
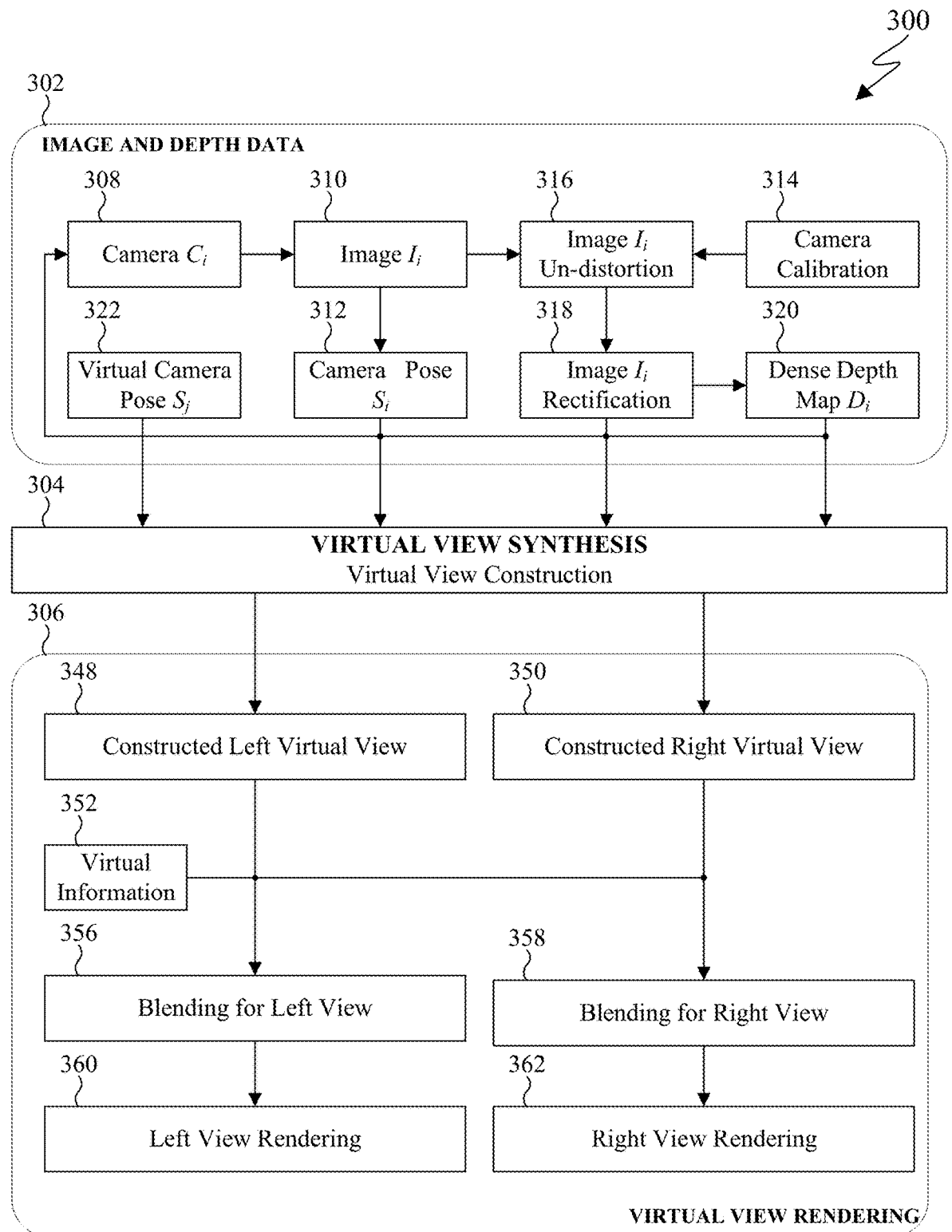
FIGS. 3A and 3B illustrate an example process of video rendering for VST AR in accordance with this disclosure.
Figure 3B:
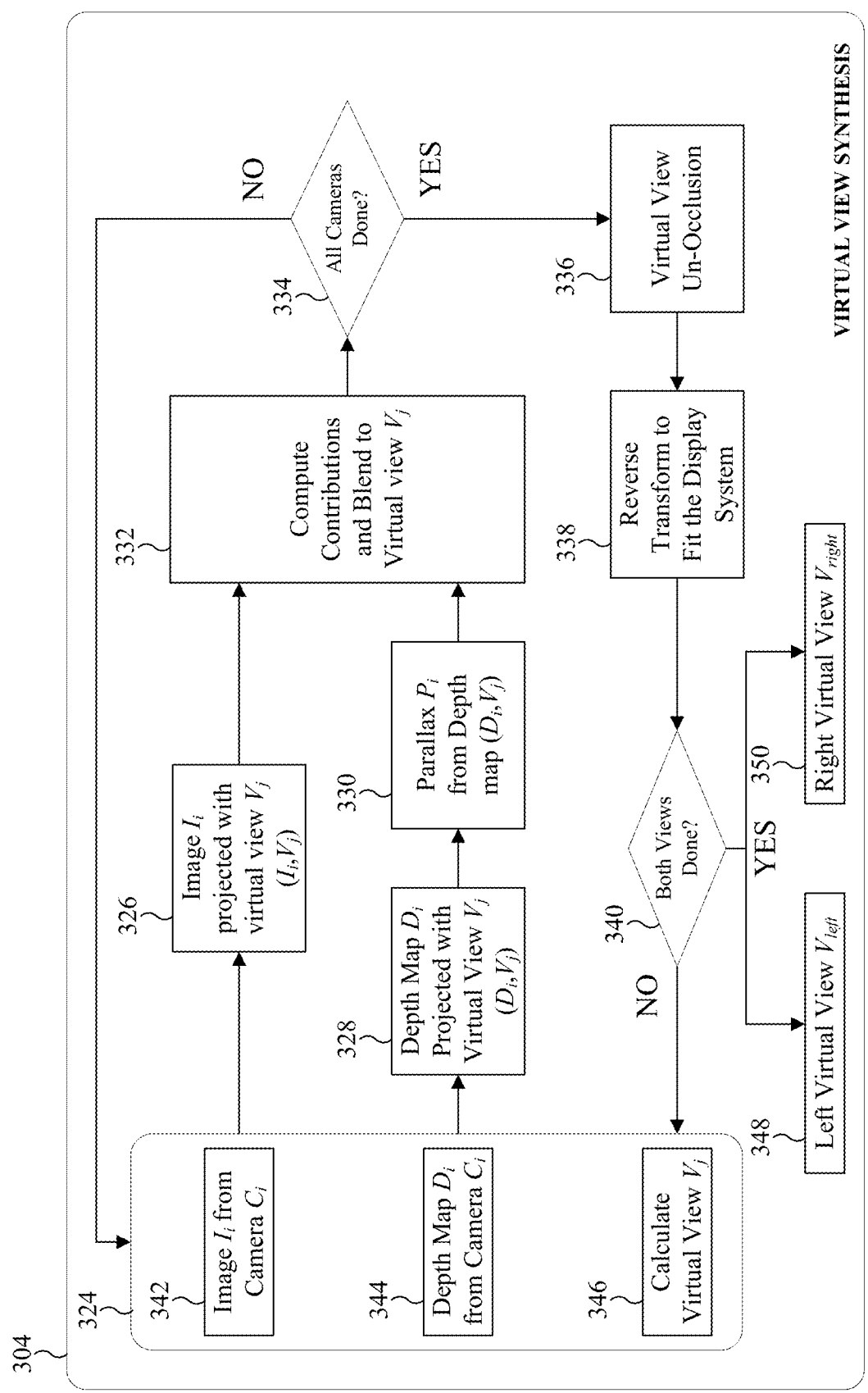

FIGS. 3A and 3B illustrate an example process 300 of video rendering for VST AR in accordance with this disclosure. For ease of explanation, the process 300 of FIGS. 3A and 3B is described as being performed using the electronic device 101 in the network configuration 100 of FIG. 1, where the electronic device 101 may be implemented as the HMD 202 of FIG. 2. However, the process 300 may be used with any other suitable device(s) and in any other suitable system(s).

As shown in FIGS. 3A and 3B, the process 300 includes an image and depth data operation 302, a virtual view synthesis operation 304, and a virtual view rendering operation 306. The process 300 can capture data from each of the cameras 204 (and optionally one or more other sensors of the electronic device 101) and output a see-through display with virtual components combined with a real-scene captured by the cameras 204. The process 300 here can determine a contribution factor for each camera and merge the contributions from the cameras into a combined camera view.

In this example, the image and depth data operation 302 can include an identify camera operation 308. The identify camera operation 308 can determine or select a camera C, 204 for use when performing additional operations 310-322. In some cases, the electronic device 101 can include a single camera 204, and the identify camera operation 308 may be omitted. In other cases, the electronic device 101 can include multiple cameras 204, such as when the electronic device 101 includes one or more sensors 180 that implement the cameras 204. In particular embodiments, the cameras 204 can be arranged in a camera configuration 200 or in another pattern to obtain a desired or optimized field of view (FOV) of the HMD 202. The operations 310-322 can be performed for each camera 204 in the camera configuration 200 on the HMD 202.

The electronic device 101 can perform an image capture operation 310 in order to capture an image using the selected camera 204. Here, the selected camera 204 can be used to capture an image $I_i$, where i represents the $i^{th}$ selected camera. Having multiple cameras 204 in a camera arrangement allows for images to be captured at different positions and orientations in order to obtain multiple views of objects in a scene. This allows for more realistic rendering of objects and also a more aesthetic relationship with virtual objects. The electronic device 101 can also perform a camera pose operation 312 in order to generate position data related to the current image $I_i$ for the current camera $C_i$. The position data can identify a position and an orientation of the selected camera 204. In some embodiments, the position and orientation of the selected camera 204 can be fixed in relation to an IMU position sensor.

The electronic device 101 can further perform a camera calibration operation 314 in order to determine intrinsic and extrinsic parameters of the cameras 204. The camera calibration operation 314 can use any suitable technique to identify the intrinsic and extrinsic parameters of the cameras 204. The intrinsic and extrinsic parameters can be used with the current image in order to perform an image un-distortion operation 316, which can be performed to un-distort the current image. For example, while wide-angle cameras can capture images at wide views, edge distortion due to lens shape is almost unavoidable. The image un-distortion operation 316 can use any suitable techniques to un-distort images. For instance, the image un-distortion operation 316 may use the intrinsic parameters and distortion model of the selected camera 204 to un-distort the current image.

The electronic device 101 can also perform an image rectification operation 318 to the current image so that the image data is not raw and is ready for feature matching. The rectification is performed to transform images from multiple cameras (or images from a single camera) and therefore multiple angles into a common plane to simplify the feature matching process. The result is that the multiple images are now each viewed from the same perspective or angle so that the images can be placed in the same common plane, which allows the points in the images to be much more easily matched (such as by using parallel matching lines). A dense depth map operation 320 can be performed to generate a dense depth map for the current image $I_i$. Depths in a scene can be reconstructed based on the current image from the selected camera 204 using the rectified image generated by the image rectification operation 318. The dense depth map operation 320 can therefore be performed to generate a dense depth map for the current image based on a respective rectified image. In some cases, the dense depth map operation 320 can receive a current frame and output depth information corresponding to pixel points in the frame. A dense depth map can be used for various functions, such as occlusion between virtual objects and a real-word scene, depth matching between perceptual depths and real-world scene depths, and depth re-projection in viewpoint transformations.

A virtual camera pose operation 322 can determine a virtual camera pose S, for use with the virtual view synthesis operation 304. As discussed previously in relation to FIGS. 2A and 2B, a virtual camera can be associated with each of the user's eyes and the rendering viewpoints 208. The virtual camera pose operation 322 can identify a location and orientation of each eye of the user or each rendering viewpoint 208 in order to determine a virtual camera pose. Again, note that the operations 310-322 can be performed for each camera 204 in order to process a collection of images captured using the cameras 204.

The virtual view synthesis operation 304 can reconstruct the viewpoints of the virtual cameras for the left and right eyes of a user. As shown in FIG. 3B, the virtual view synthesis operation 304 includes input operations 324, a virtual view projection operation 326, a virtual view depth map projection operation 328, a parallax operation 330, a contribution and blending operation 332, a camera complete determination 334, an un-occlusion operation 336, a reverse transform operation 338, and a views complete determination 340. The input operation 324 includes a current image operation 342, a current depth map operation 344, and a calculate virtual view operation 346. The input operation 324 can determine an order for processing the cameras 204 through operations 326-334. In some cases, the electronic device 101 can receive a current image for the selected camera 204 in the processing order for the current image operation 342 and a current depth map for the selected camera 204 in the processing order for the current depth map operation 344. For example, the current image can be received as a result of the image rectification operation 318, and the current depth map can be received as a result of the dense depth map operation 320. The electronic device 101 can track a progress of processing each camera 204 through the operations 324-334.

The calculate virtual view operation 346 can determine virtual viewpoints $V_j$ of the virtual cameras for adjusting each of the current images. In some cases, the calculation can utilize the current camera pose $S_i$ and the virtual camera pose $S_j$ to determine the virtual viewpoints. In some embodiments, the subscript j here can correspond to or indicate either left or right, such as a left virtual camera viewpoint $V_{left}$ or a right virtual camera viewpoint $V_{right}$. The viewpoints are based on the current image $I_i$ and the current virtual viewpoint $V_j$. For example, the calculate virtual view operation 346 can determine how to perform warping in order to transfer one or more video frames from see-through camera positions to virtual camera positions, which can be used to generate the left virtual camera viewpoint $V_{left}$ and the right virtual camera viewpoint $V_{right}$. As a particular example, the calculate virtual view operation 346 may generate one or more transformations that help match camera viewpoints to virtual viewpoints $V_j$.

The virtual view depth map projection operation 328 can use the current dense depth maps to perform depth re-projections. For instance, a current dense depth map can be depth re-projected from a camera viewpoint to the left virtual camera viewpoint $V_{left}$ and the right virtual camera viewpoint $V_{right}$. The depths are adjusted based on the difference between the camera viewpoint and the virtual viewpoint. The parallax operation 330 can be performed to identify adjustments that might be needed to remove view artifacts in an overlapping area between the cameras. For example, because a camera viewpoint is not identical to eye and rendering viewpoints, objects at different depths can be distorted if adjusted equally. As a particular example, objects closer in depths to the viewpoints may be adjusted at greater rates than objects at further distances or a background of a real-world scene. The parallax operation 330 can determine differences in viewing relative pixel locations or objects in three-dimensional (3D) space based on line-of-sight and can correct these differences in virtual views. For instance, the parallax operations 330 may correct pixels or objects in the real-world scene that are affected by the parallax in three frames captured by three different cameras.

The contribution and blending operation 332 can be used to determine contributions of each image from a camera to be blended into a virtual view. For example, the contribution and blending operation 332 can determine a contribution for each pixel from a specific camera for a scene using a parallax map $P_i$. The contribution can be based on a confidence of the pixel from a camera. For the contribution and blending operation 332, the electronic device 101 can respectively combine the pixel contributions from each image into virtual video frames. A location in the virtual view for each pixel in an image can be identified using the parallax information calculated by the parallax operation 330. For the camera complete determination 334, the electronic device 101 can determine whether each camera's contributions have been blended into the virtual video frames. The operations 324-332 here can be repeated until the contributions of all see-through cameras 204 are computed and blended with the virtual view contribution and blending operation 332. When at least one of the cameras 204 has not been processed, the electronic device returns to the input operation 324.

When all of the cameras 204 have been processed, the electronic device 101 can perform an un-occlusion operation 336 on the virtual video frame. The un-occlusion operation 336 can detect missing or incorrect data that develops during the contribution and blending operation 332. Holes or missing information can be introduced when occlusions are created by depth warping. The missing information can be filled in various ways, such as pixel expansion, pixel patch replacement from previous image captures, or any other suitable technique for recovering missing information. The reverse transform operation 338 transforms the virtual video frame to fit a display or multiple displays. The reverse transform operation 338 can be performed to identify and compensate for lens distortions of a VST headset. For example, the reverse transform operation 338 can be used to identify any geometric distortions in a warped image and to remap a source image to an un-warped image as if it was taken with a perspective lens. The reverse transform operation 338 can also calibrate an image based on known different indices of refraction across a lens, which can increase false colors in an image as distance for a pixel is further from a center of the image. Any chromatic aberrations can be corrected according to lens data and focal length information using the reverse transform operation 338, where the electronic device 101 uses the information from the reverse transform operation 338 to correct the virtual view video frame based on characteristics of first and second display panels (which are described below).

For the views complete determination 340, the electronic device 101 can determine whether a left virtual view $V_{left}$ 348 and a right virtual $V_{right}$ 350 were generated. The electronic device 101 can repeat the operations 324-338 until all virtual views have been generated. At this point, the electronic device 101 prepares the left virtual view $V_{left}$ 348 and the right virtual view $V_{right}$ 350 for virtual view rendering operations 306. When one of the views has not been generated, the electronic device 101 performs the input operation 324 for the non-generated view and resets any counters or tracking related to the camera complete determination 334.

As shown in FIG. 3A, the virtual view rendering operation 306 can perform post-processing on the left virtual view 348 and the right virtual view 350. For the virtual view rendering operations 306, the electronic device 101 can blend virtual information 352 with the left virtual view $V_{left}$ 348 and the right virtual view $V_{right}$ 350 in blending operations 356 and 358. For the blending operations 356 and 358, the electronic device 101 can respectively combine virtual objects into the left virtual view $V_{left}$ 348 and the right virtual view $V_{right}$ 350. The virtual objects can be positioned, oriented, and colored based on the information from the virtual information 352. In some cases, one or more of these operations can be implemented using processing on a GPU with CPU/GPU interoperability to share memory buffers between the CPU and the GPU. The blending operations 356 and 358 can use the first and second dense depth maps for occlusion between virtual objects and the real-world scene. First and second display rendering operations 360 and 362 can render the left virtual view $V_{left}$ 348 and the right virtual view $V_{right}$ 350 for display on a display panel. In some cases, the electronic device 101 can display a first video frame on a first panel and a second video frame on a second panel. Depending on the implementation, the left virtual view $V_{left}$ 348 and the right virtual view $V_{right}$ 350 can be pre-rendered or can be dynamically rendered.

Although FIGS. 3A and 3B illustrate one example of a process 300 of video rendering for VST AR, various changes may be made to FIGS. 3A and 3B. For example, while shown as a series of operations, various operations in FIGS. 3A and 3B may overlap, occur in parallel, occur in a different order, or occur any number of times.

Figure 4:
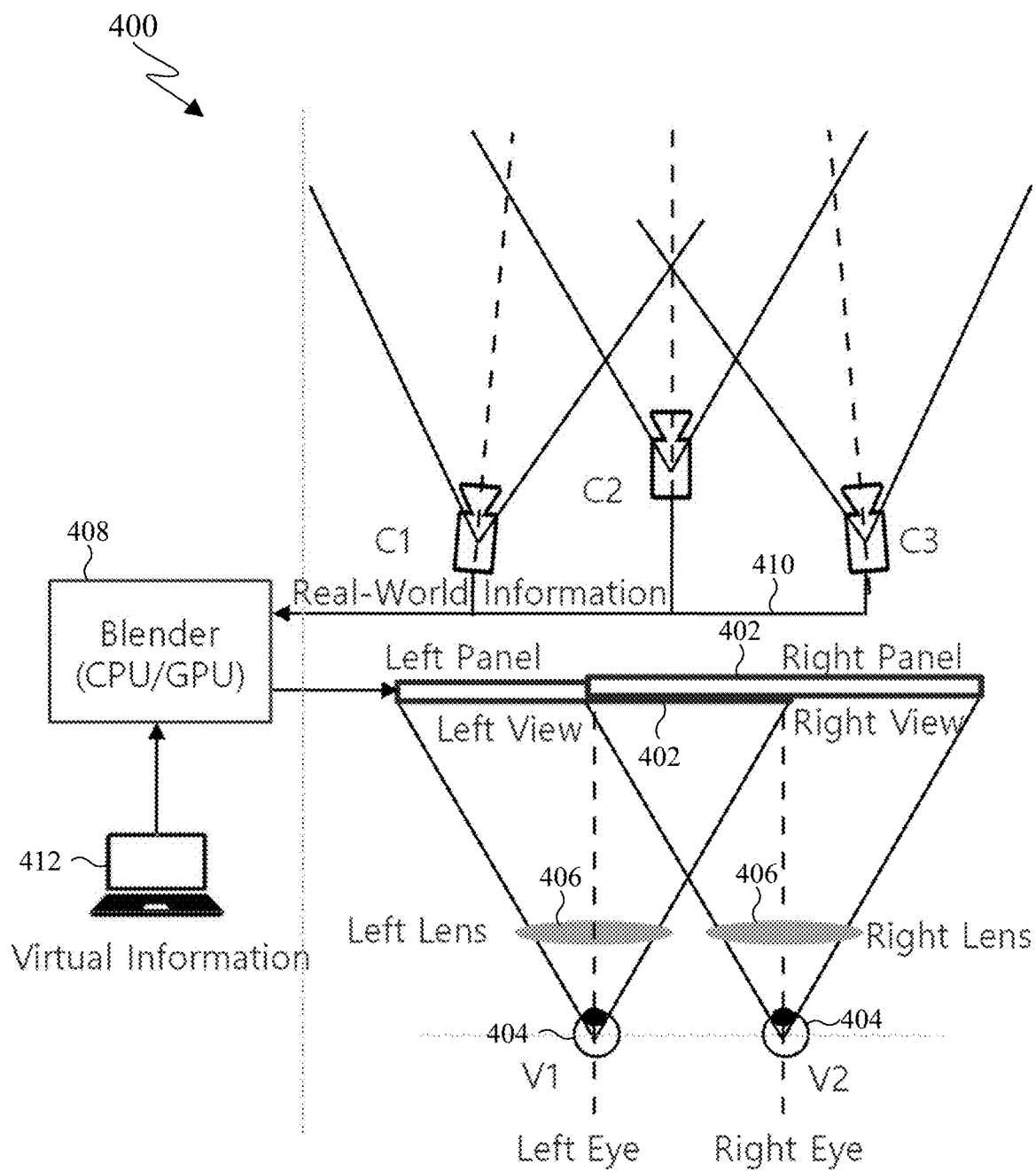
FIG. 4 illustrates an example video generation pipeline for VST AR in accordance with this disclosure.

FIG. 4 illustrates an example VST AR pipeline 400 in accordance with this disclosure. For ease of explanation, the VST AR pipeline 400 may be described as being implemented using the electronic device 101 in the network configuration 100 of FIG. 1, where the electronic device 101 may be implemented as the HMD 202 of FIG. 2. However, the VST AR pipeline 400 may be used in any other suitable device(s) and in any other suitable system(s).

As shown in FIG. 4, the VST AR pipeline 400 can be used to generate and present one or more AR or VR objects on two panels 402, where the panels 402 are viewed by a user's eyes 404 through dedicated lenses 406. In some embodiments, the panels 402 can be VST AR displays that are see-through with the exception of one or more projected AR or VR objects on the panels 402. Any suitable AR or VR objects may be projected onto the panels 402. In some embodiments, one or more AR or VR objects may be selected for presentation based on the real-world scene being viewed by the user or an application being executed on a device implementing the VST AR pipeline 400.

The VST AR pipeline 400 also incorporates a blender 408 that can receive real-world information 410 and virtual information 412 and that can process the information 410 and 412 in order to generate one or more AR or VR objects for display on the panels 402. In some cases, the real-world information 410 can include information captured from one or more sensors, such as one or more optical sensors, accelerometers, gravity sensors, ambient light sensors, proximity sensors, magnetism sensors, gyroscopes, position sensors, etc. Also, in some cases, the virtual information 412 can include information related to the one or more AR or VR objects to be presented to the user, and different virtual information 412 may be associated with different real-world information 410. The virtual information 412 may be stored on a device implementing the VST AR pipeline 400 or on another device, such as a server 106. In some embodiments, the blender 408 can represent at least one processing device, such as the processor 120. In this particular example, the blender 408 is shown as including a CPU or GPU, although other implementations of the blender 408 are possible using other types of processing devices.

Although FIG. 4 illustrates one example of a VST AR pipeline 400, various changes may be made to FIG. 4. For example, the number of various components of the pipeline 400 can vary as needed or desired. As particular examples, the VST AR pipeline 400 may include multiple blenders 408, such as one blender 408 per panel 402 or multiple blenders 408 per panel 402. In addition, the VST AR pipeline 400 may be used to perform any suitable video transformation process.

Figure 5:
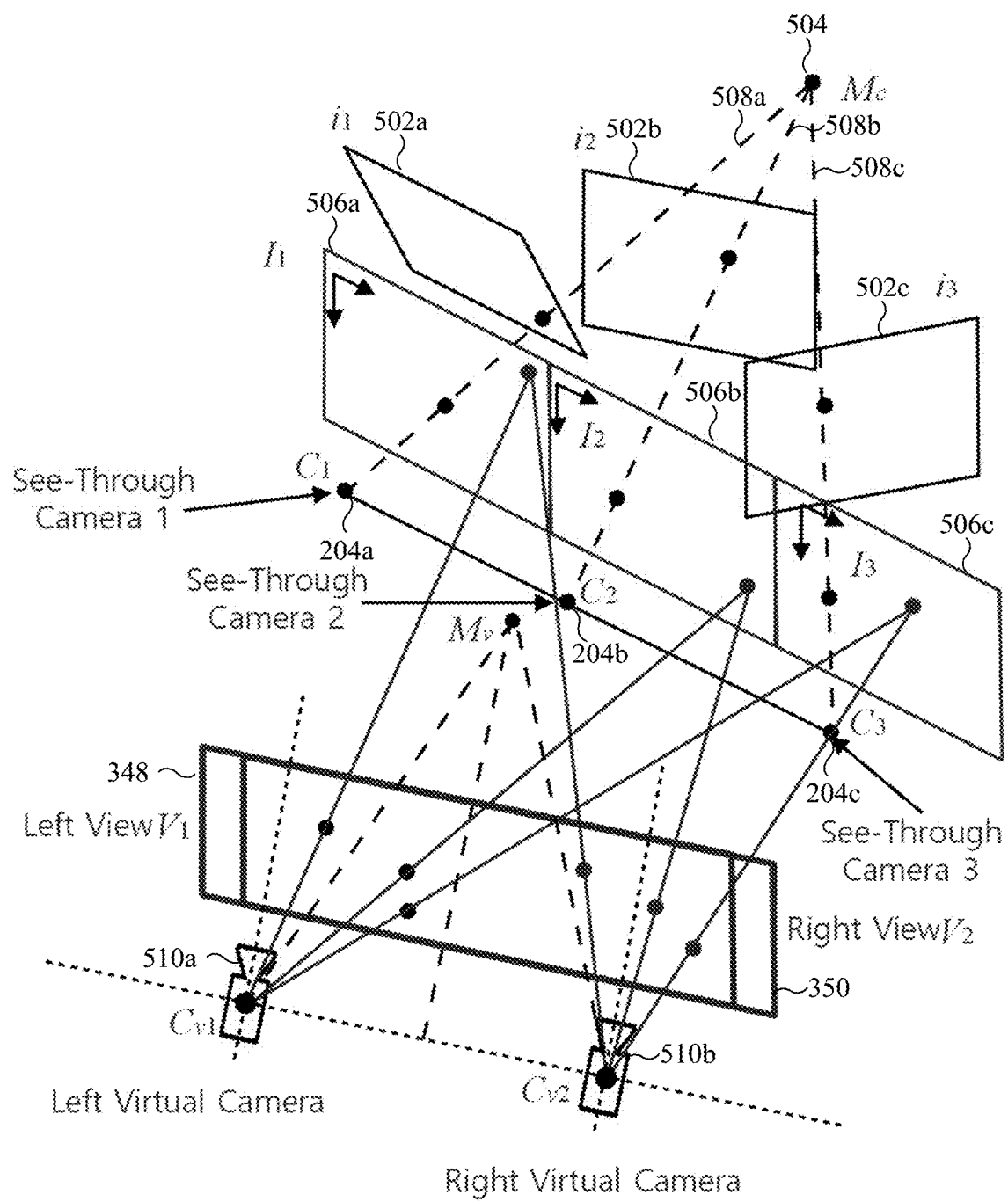
FIG. 5 illustrates an example video rendering for VST AR in accordance with this disclosure.

FIG. 5 illustrates an example technique 500 for video rendering of VST AR in accordance with this disclosure. For ease of explanation, the technique 500 of FIG. 5 is described as being performed using the electronic device 101 in the network configuration 100 of FIG. 1, where the electronic device 101 may be implemented as the HMD 202 of FIG. 2. However, the technique 500 may be used with any other suitable device(s) and in any other suitable system(s).

As shown in FIG. 5, the technique 500 uses three see-through cameras 204a-204c but can be modified for use with any suitable number of cameras 204. The see-through cameras 204a-204c can capture images 502a-502c of an object 504. Rectified images 506a-506c can be respectively obtained from the images 502a-502c, such as when the rectified images 506a-506c are generated using the image rectification operation 318. Corresponding epipolar lines of the rectified images 506a-506c are co-linear and can be used as stereo pairs.

Depths 508a-508c can be computed as distances from the cameras 204a-204c to the object 504. In embodiments with a single camera 204, a deep learning approach or other suitable technique can be utilized to estimate a depth map for the single camera 204. In embodiments with multiple cameras 204, stereo camera pairs or other techniques can be utilized to compute depth maps for each camera 204a-204c.

In some cases, a deep neural network (DNN) or other machine learning model can be used to extract feature maps and to estimate disparity maps. A dense depth map can be generated from the extracted feature maps, estimated disparity maps, and computed depth maps. The dense depths maps can be generated according to the dense depth map operation 320.

Contributions, contribution confidence maps, parallax maps, and parallax contribution maps can be generated for each camera 204a-204c in the parallax operation 330 and the contributions and blend operation 332. The contributions, contribution confidence maps, parallax maps, and parallax confidence maps can be used to create and render the left virtual view $V_{left}$ 348 for the left virtual camera 510a and the right virtual view $V_{right}$ 350 for the right virtual camera 510b in the left and right rendering operations 360 and 362.

Although FIG. 5 illustrates one example of a technique 500 for video rendering of VST AR, various changes may be made to FIG. 5. For example, while shown as a series of operations, various operations in FIG. 5 may overlap, occur in parallel, occur in a different order, or occur any number of times.

Figure 6:
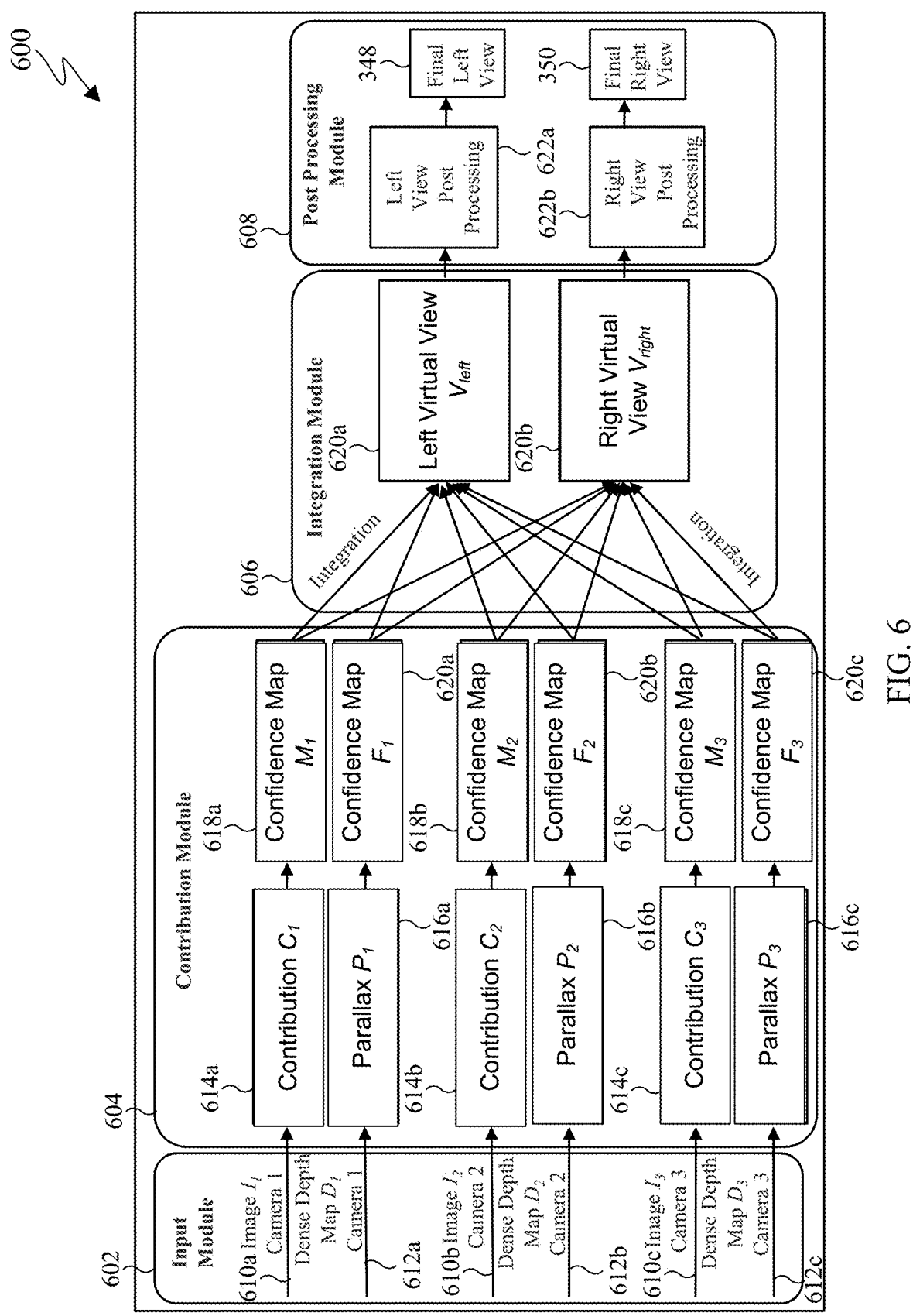
FIG. 6 illustrates an example virtual view computation for VST AR in accordance with this disclosure.

FIG. 6 illustrates an example system 600 for virtual view computation for VSTAR in accordance with this disclosure. For ease of explanation, the system 600 may be described as being implemented using the electronic device 101 shown in FIG. 1, the HMD 202 shown in FIG. 2, or the blender 408 shown in FIG. 4. However, the system 600 may be used in any other suitable device(s) and in any other suitable system(s).

As shown in FIG. 6, the system 600 can produce a final left virtual view 348 and a final right virtual view 350. The system 600 can include an input module 602, a contribution module 604, an integration module 606, and a post-processing module 608. Depending on the implementation, the system 600 may be implemented in an HMD or other immersive reality device, and the processor 120 may be used to perform the functions for each of the input module 602, the contribution module 604, the integration module 606, and the post-processing module 608.

In this example, the input module 602 can receive, capture, store, and process the inputs for the system 600. For example, the input module 602 can prepare images 610a-610c and corresponding dense depth maps 612a-612c. While the illustrative example shows the system 600 including three cameras 204, the operations can be performed in systems with more or less than three cameras 204. The electronic device 101 can perform operations 308-318 to prepare the images 610a-610c and can perform the dense depth map operation 320 to prepare the depth maps 612a-612c that correspond to the images 610a-610c.

The contribution module 604 can determine a factor or contribution 614a-614c for each image 610a-610c used for the virtual left view 348 and the virtual right view 350. For example, the contribution module 604 can compute the contributions 614a-614c in the contribution and blending operation 332. The contribution module 604 can compute a contribution 614a-614c of a specified see-through camera 204a-204c to a virtual view of a virtual camera and compute contribution confidence maps 618a-618c for respective contributions 614a-614c. The contribution confidence maps 618a-618c can provide a ratio or factor for how much of the contribution 614a-614c is used in generating the left and right virtual views 348 and 350. A high confidence indicates a high similarity in pose between the see-through camera 204 and the virtual camera, and low confidence indicates a low similarity in pose between the see-through camera 204 and the virtual camera. The operations of the contribution module 604 may be performed separately for the left virtual view 348 and the right virtual view 350. The contribution module 604 can also compute a parallax map 616a-616c of each see-through camera 204 to the virtual view of a virtual camera using the depth maps 612a-612c. The parallax map 616a-616c can be generated when the electronic device 101 performs the parallax operation 330. The parallax maps 616a-616c can identify displacement of objects at different depths. The parallax confidence maps 620a-620c are similar to the contribution confidence maps 618a-618c, but the parallax confidence maps 620a-620c are directed to a confidence of the parallax maps 616a-616c.

The integration module 606 can integrate the contributions 614a-614c, the parallax maps 616a-616c, the contribution confidence maps 618a-618c, and the parallax confidence maps 620a-620c to generate rough left and right virtual views 620a and 620b. For example, the integration module 606 can generate the rough left and right virtual views 620a and 620b by performing operation 332. The integration module 606 can integrate the contributions 614a-614c and parallax maps 616a-616c by using a contribution 614 with a higher confidence on a front layer and a lower confidence as a back layer for the rough left and right virtual views 620a and 620b. The use of the confidence maps can reduce artifacts of mis-occlusion and mixing of foreground and background color at a discontinuity of a depth map. The post-processing module 608 can adjust the rough left and right virtual views 620a and 620b to correct any deficiencies detected during the integration process. For instance, the rough left and right virtual views 620a and 620b can have some artifacts from the integration process that includes un-occlusion, object contours, sampling gaps, etc. The post-processing module 608 can recover missing information from an image frame sequence and hole filling operations.

Although FIG. 6 illustrates one example of a system 600 for virtual view computation for VST AR, various changes may be made to FIG. 6. For example, the system 600 may have dedicated input modules and contribution modules for each camera or more than one for each of the input module 602, the contribution module 604, the integration module 606, and the post-processing module 608. In addition, the system 600 may be used in any other suitable video rendering device and is not limited to the specific processes described above.

Figure 7:
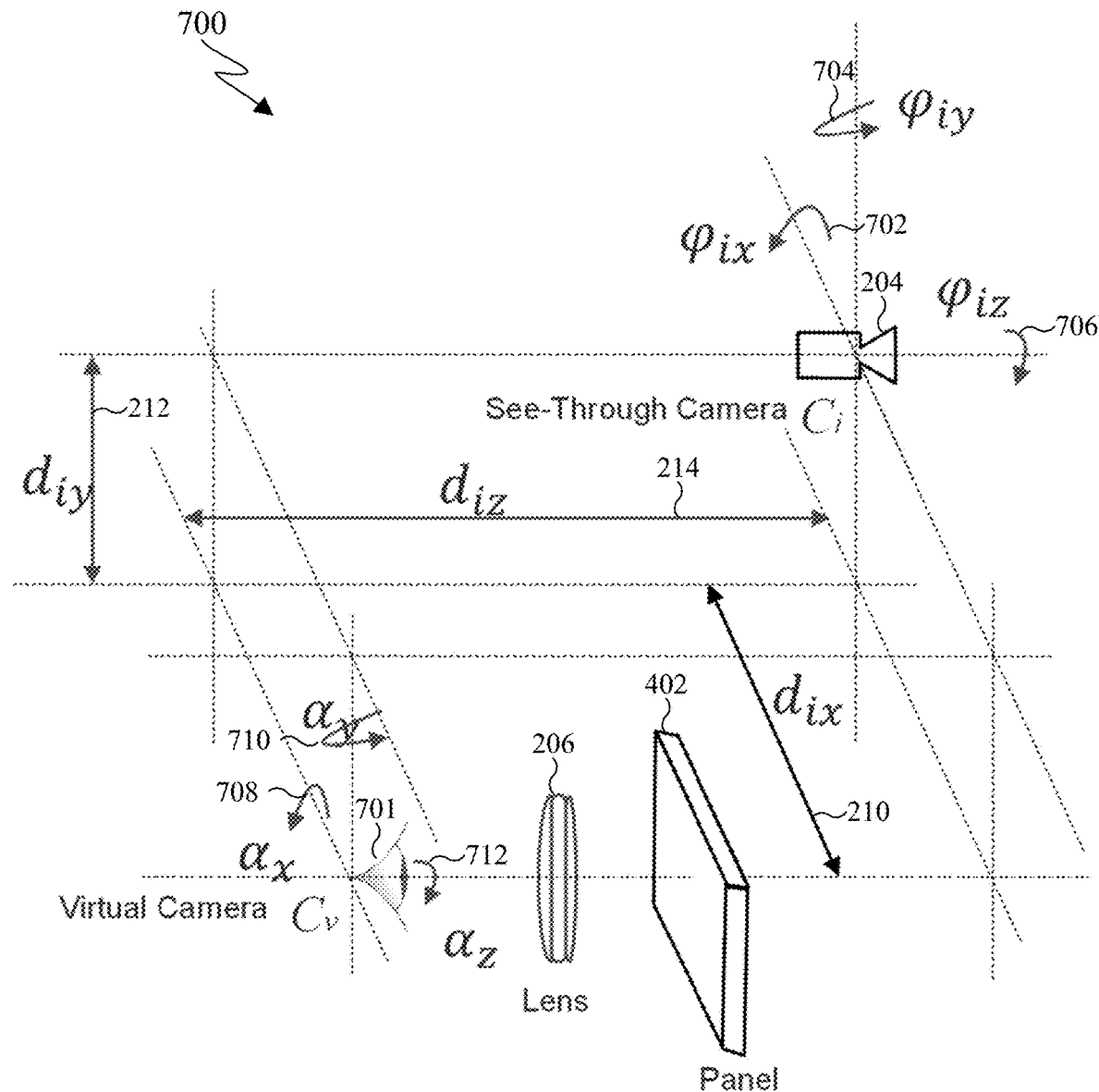
FIG. 7 illustrates an example camera layout for VST AR in accordance with this disclosure.

FIG. 7 illustrates an example camera layout 700 in VST AR in accordance with this disclosure. For ease of explanation, the camera layout 700 of FIG. 7 is described as being used with the electronic device 101 in the network configuration 100 of FIG. 1, where the electronic device 101 may be implemented as the HMD 202 of FIG. 2. However, the camera layout 700 may be used with any other suitable device(s) and in any other suitable system(s). The camera layout 700 can be used for explaining a creation of one or more confidence maps.

As shown in FIG. 7, the camera layout 700 illustrates a relationship between a see-through camera 204 and a virtual camera 701 at an eye viewpoint. The relationship discussed below can be extend to each camera 204 on an HND 202. For the camera layout 700, a pose of the camera 204 is defined by an x-rotation ($\varphi_{ix}$) 702, a y-rotation ($\varphi_{iy}$) 704, and a z-rotation ($\varphi_{iz}$) 706. Also, a pose of the virtual camera 701 is defined based on an x-rotation ($\alpha_x$) 708, a y-rotation ($\alpha_y$) 710, and a z-rotation ($\alpha_z$) 712. In addition, a distance between the camera 204 and the virtual camera 701 is defined based on a horizontal distance ($d_{ix}$) 210, a vertical distance ($d_{iy}$) 212, and a depth ($d_{iz}$) 214. In some cases, an orientation difference and a position difference between the see-through camera 204 and the virtual camera 701 can be determined as follows.

$$\text{diff}_{oi} = \sqrt{(\alpha_x - \varphi_{ix})^2 + (\alpha_y - \varphi_{iy})^2 + (\alpha_z - \varphi_{iz})} \quad (1)$$

$$\text{diff}_{pi} = \sqrt{d_{ix}^2 + d_{iy}^2 + d_{iz}^2} \quad (2)$$

Here, $\text{diff}_{oi}$ represents an orientation difference, and $\text{diff}_{pi}$ represents a position difference. A total orientation difference and a total position difference for all the see-through cameras 204 can be determined as follows.

$$\text{diff}_o = \Sigma_{i=1}^n \text{diff}_{oi} \quad (3)$$

$$\text{diff}_p = \Sigma_{i=1}^n \text{diff}_{pi} \quad (4)$$

Here, $\text{diff}_o$ represents a total orientation difference, and $\text{diff}_p$ represents a total position difference. In some cases, the total differences can be normalized as follows.

$$\text{diff}_{oni} = \frac{\text{diff}_{oi}}{\text{diff}_o}, (i = 1, 2, \ldots n) \quad (5)$$

$$\text{diff}_{pni} = \frac{\text{diff}_{pi}}{\text{diff}_p}, (i = 1, 2, \ldots n) \quad (6)$$

Here, $\text{diff}_{oni}$ represents a normalized orientation difference, and $\text{diff}_{pni}$ represents a normalized position difference. The confidence for each see-through camera $C_i$ (i=1, 2, . . . n) can be determined as follows.

$$m_i = \lambda_{oi} \frac{1}{\text{diff}_{oni}} + \lambda_{pi} \frac{1}{\text{diff}_{pni}}, (i = 1, 2, \ldots n) \quad (7)$$

Here, $m_i$ represents a confidence of a see-through camera $C_i$, and $(\lambda_{oi}, \lambda_{pi})$ represent the weights for the information from the orientation difference and the position difference. In some cases, the weights for the orientation difference and the position difference can be determined as follows.

$$\lambda_{oi} + \lambda_{pi} = 1 \quad (8)$$

The virtual view can be integrated by blending the contributions of all see-through cameras 204 with each corresponding confidence map. In some cases, the color of the virtual view can be determined as follows.

$$c_j = \Sigma_{n=1}^n w_i m_{ni} c_{ij} (j=1,2, \text{number of pixels}) \quad (9)$$

Here, $c_j$ represents a color, and $w_i$ represents a weight for color blending. In some cases, the weight w, can be determined as follows.

$$Z_{i=1}^n w_i = 1 \quad (10)$$

A normalized confidence can be used to determine a factor in relation to each of the other cameras. In some cases, the normalized confidence can be determined as follows.

$$m_{ni} = \frac{m_i}{\sum_{i=1}^n m_i} (i = 1, 2, \ldots, n) \quad (11)$$

Here, $m_{ni}$ represents a normalized confidence of a see-through camera $C_i$. When a current point in a field of view is not in view or is obstructed from the view of a see-through camera 204, the confidence may be set to zero or a nominal value in the confidence map of an image corresponding to the specified see-through camera 204.

Although FIG. 7 illustrates one example of a camera layout 700 in VST AR, various changes may be made to FIG. 7. For example, the camera layout 700 can include any suitable number of cameras and can be replicated for both eyes of a user and multiple lenses or panels of an HMD 202. In addition, the camera layout 700 may be used in any other suitable video rendering device and is not limited to the specific processes described above.

Figure 8:
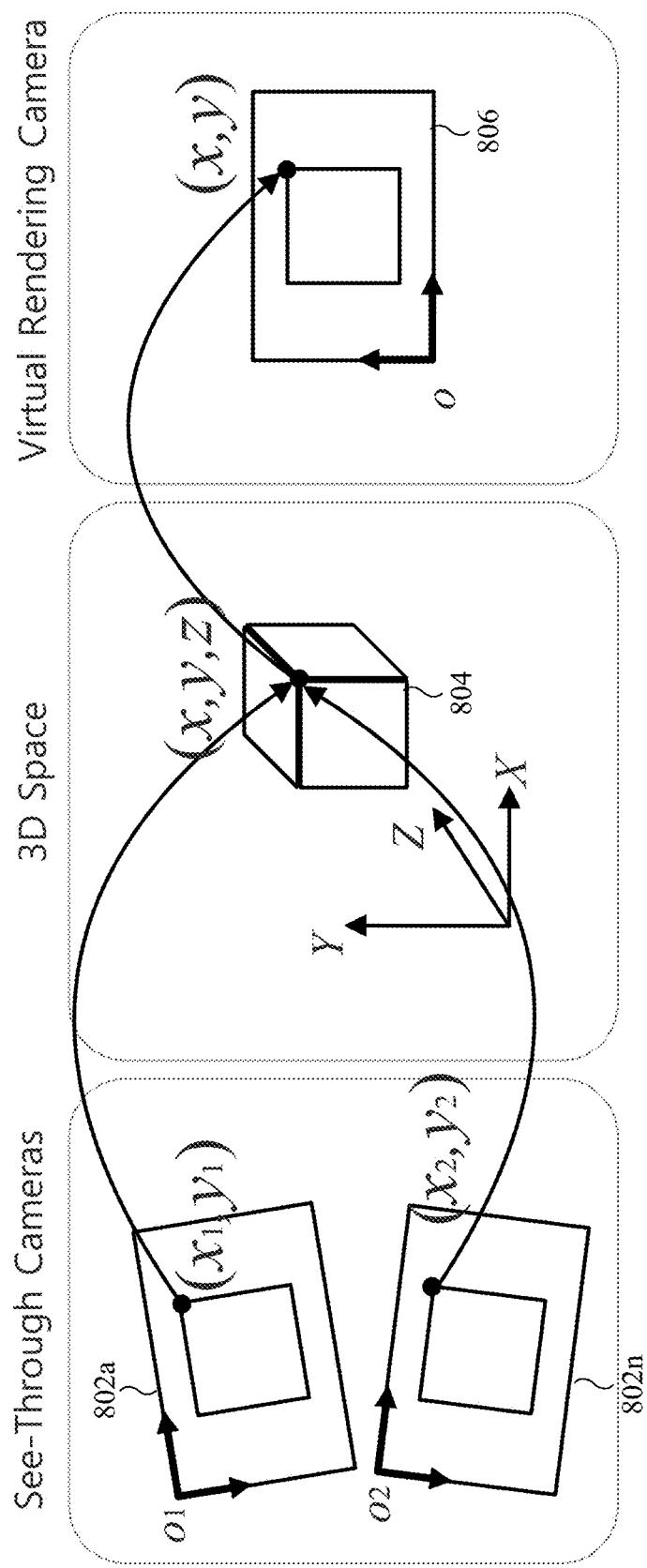
FIG. 8 illustrates an example extension of video rendering for VST AR in accordance with this disclosure.

FIG. 8 illustrates an example extension 800 of video rendering for VST AR in accordance with this disclosure. The extension 800 shown in FIG. 8 may be used in any of the devices, systems, processes, and techniques described above or below. As shown in FIG. 8, the extension 800 can warp images 802a-802n into a warped image 804 in 3D space in a global coordinate system with corresponding depth maps. In some cases, the warped 3D points can be determined as follows.

$$(x1,y1) \rightarrow (x,y,z), (x2,y2) \rightarrow (x,y,z) \quad (12)$$

The warped 3D points can be projected to a virtual view 806 of virtual rendering cameras. In some cases, the projection can be determined as follows.

$$(x,y,z) \rightarrow (x,y) \quad (13)$$

After the virtual views have been projected, post-processing can be performed to fill holes from un-occlusion and sampling gaps for the left and right final views.

In some embodiments, blending operations can determine a see-through camera 204 that is closest in distance to a virtual camera. A virtual view for that virtual camera can be constructed using the image and depth map from the closest see-through camera 204. One or more additional cameras 204 can be used for post-processing procedures, including filling sampling gaps and filling holes for un-occlusions.

Although FIG. 8 illustrates one example of an extension 800 of video rendering for VST AR, various changes may be made to FIG. 8. For example, different numbers of cameras can be utilized in the 3D space for the virtual rendering camera. In addition, the extension 800 may be used in any other suitable video rendering device and is not limited to the specific processes described above.

Figure 9:
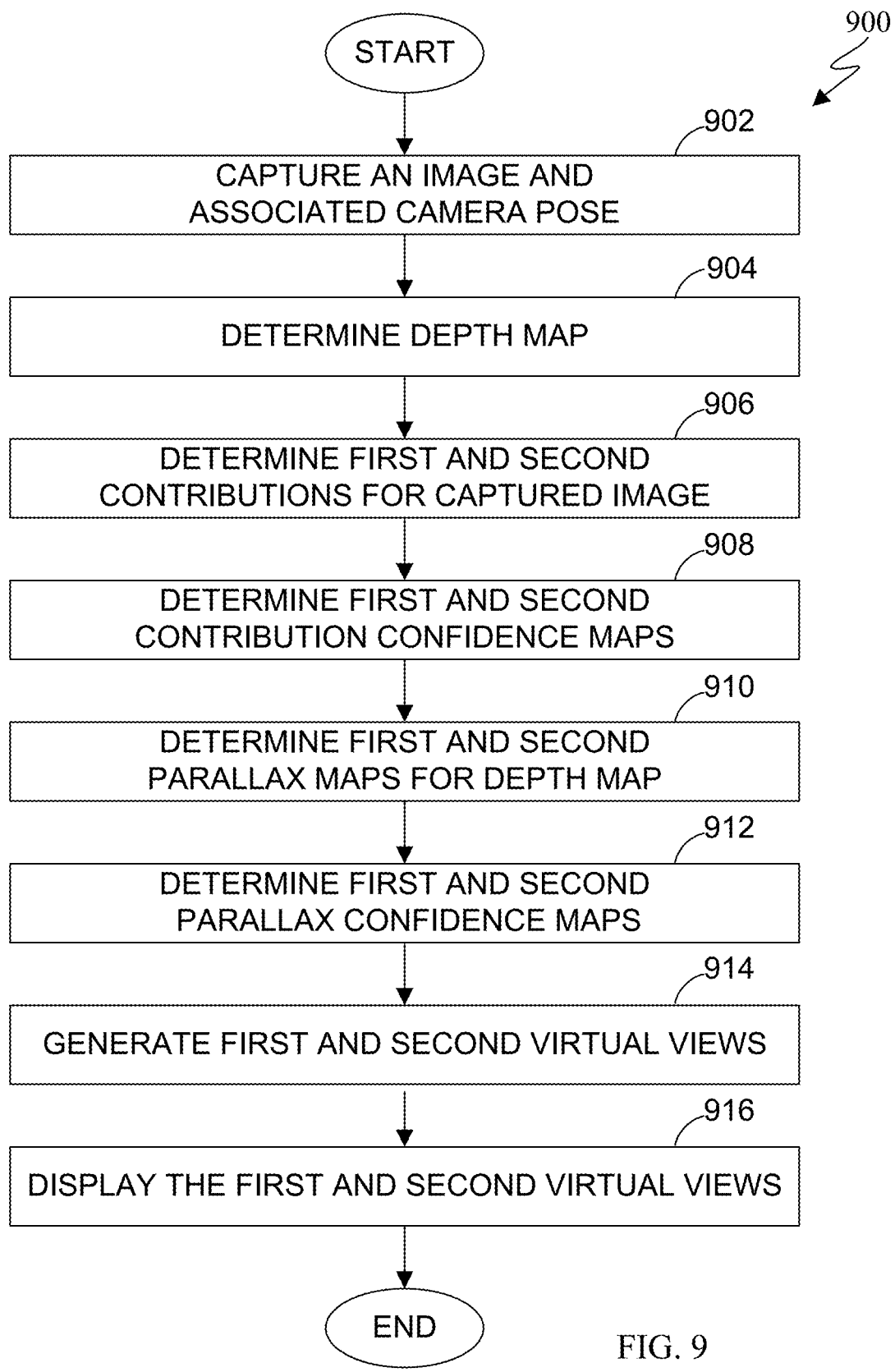
FIG. 9 illustrates an example method for video rendering for VST AR according to this disclosure.

FIG. 9 illustrates an example method 900 for video rendering for VST AR according to this disclosure. For ease of explanation, the method 900 of FIG. 9 is described as being performed using the electronic device 101 of FIG. 1, where the electronic device 101 may be implemented as the HMD 202 of FIG. 2. However, the method 900 may be used with any other suitable device(s) and in any other suitable system(s).

As shown in FIG. 9, the electronic device 101 can capture an image and associated camera pose at operation 902. For example, an image and associated camera pose can be obtained for each of multiple cameras 204 on an HMD 202. The electronic device 101 can perform un-distortion operations 316 and image rectification operations 318 on each of the captured images. A depth map can be determined for each image and associated camera pose at operation 904. For example, the electronic device 101 can perform a dense depth map operation 320 to produce a dense depth map for each captured image, and the depth map can identify depths of pixels in the associated image.

First and second contributions of the captured image can be determined in operation 906. For example, the electronic device 101 can determine a first contribution of the captured image for a first virtual view for display on a first display of the AR device and a second contribution of the captured image for a second virtual view for display on a second display of the AR device. A distance between each of the cameras to the virtual camera can be determined based on an arrangement of the HMD 202. First and second contribution confidence maps corresponding to the first and second contributions can be determined in operation 908. For example, the electronic device 101 can determine a first confidence map for the first virtual view based on the camera pose and a position of the camera in relation to a first virtual camera and a second confidence map for the second virtual view based on the camera pose and the position of the camera in relation to a second virtual camera. The first eye of the user can correspond to the first virtual camera, and the second eye of the user can correspond to the second virtual camera. Confidences for the first and second contribution confidence maps can be determined based on distance and orientation differences between the camera and the respective first and second virtual cameras, where the confidence increases as the difference between the camera and the respective first and second virtual cameras decreases.

First and second parallax maps can be determined from the depth maps at operation 910. For example, the electronic device 101 may, for each of the cameras 204, determine a first parallax map for the first virtual camera and a second parallax map for the second virtual camera by projecting a depth map associated with the captured image onto an image plane of the first and second displays. The first parallax map can be used to identify a location of the first contribution in the first virtual view, and the second parallax map can be used to identify a location of the second contribution in the second virtual view. First and second parallax confidence maps can be determined from the depth map and parallax maps at operation 912. For example, the electronic device 101 may, for each of the cameras 204, determine a first parallax confidence map associated with the first parallax map for the first virtual view based on the camera pose and the position of the camera in relation to the first virtual camera and a second parallax confidence map associated with the second parallax map for the second virtual view based on the camera pose and the position of the camera in relation to the second virtual camera. The first and second parallax confidence maps can be used to identify a priority of respective first and second parallax maps in generating the first and second virtual views, where a parallax map with a higher priority may be used in a layer in front of a parallax map with a lower priority.

First and second virtual view can be generated from the contributions and the contribution confidence maps at operation 914. For example, the electronic device 101 can generate the first virtual view by combining the first contribution using the first confidence map for each of the cameras 204 and the second virtual view by combining the second contribution using the second confidence map for each of the cameras 204. The first parallax map and the first parallax confidence map can be used in generating the first virtual view, and the second parallax map and the second parallax confidence map can be used in generating the second virtual view.

The first and second virtual views can be displayed in operation 916. For example, the electronic device 101 can display the first virtual view on a first display and the second virtual view on a second display. As a particular example, the first and second virtual views 348 and 350 can be displayed on the left and right panels 402 shown in FIG. 4 or displayed on the HMD 202 shown in FIG. 2.

Although FIG. 9 illustrates one example of a method 900 for video rendering for VST AR, various changes may be made to FIG. 9. For example, while shown as a series of steps, various steps in FIG. 9 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method for video rendering for video see-through (VST) augmented reality (AR) on an AR device, the method comprising:
for each of a plurality of cameras of the AR device:
capturing an image and associating the captured image with a camera pose;
determining (i) a first contribution of the captured image for a first virtual view for display on a first display of the AR device and (ii) a second contribution of the captured image for a second virtual view for display on a second display of the AR device; and
determining (i) a first confidence map for the first virtual view based on the camera pose and a position of the camera in relation to a first virtual camera and (ii) a second confidence map for the second virtual view based on the camera pose and the position of the camera in relation to a second virtual camera; and
generating (i) the first virtual view by combining the first contribution using the first confidence map for each of the plurality of cameras and (ii) the second virtual view by combining the second contribution using the second confidence map for each of the plurality of cameras.

2. The method of claim 1, further comprising:
for each of the plurality of cameras, determining a first parallax map for the first virtual camera and a second parallax map for the second virtual camera by projecting a depth map associated with the captured image onto image planes of the first and second displays;
wherein the first parallax map is used in generating the first virtual view and the second parallax map is used in generating the second virtual view.

3. The method of claim 2, wherein:
the first parallax map is used to identify a location of the first contribution in the first virtual view; and
the second parallax map is used to identify a location of the second contribution in the second virtual view.

4. The method of claim 2, further comprising:
for each of the plurality of cameras, determining (i) a first parallax confidence map associated with the first parallax map for the first virtual view based on the camera pose and the position of the camera in relation to the first virtual camera and (ii) a second parallax confidence map associated with the second parallax map for the second virtual view based on the camera pose and the position of the camera in relation to the second virtual camera;
wherein the first parallax confidence map is used in generating the first virtual view and the second parallax confidence map is used in generating the second virtual view.

5. The method of claim 4, wherein:
the first parallax confidence map is used to identify a priority of the first parallax map in generating the first virtual view; and the second parallax confidence map is used to identify a priority of the second parallax map in generating the second virtual view.

6. The method of claim 5, wherein a parallax map with a higher confidence than another parallax map is used in a front layer construction of a virtual view in relation to the other parallax map.

7. The method of claim 1, wherein:
a confidence for the first or second confidence map is determined based on distance and orientation differences between the camera pose and the first or second virtual camera; and
the confidence increases as the distance and orientation differences between the camera and the first or second virtual camera decrease.

8. A video see-through (VST) augmented reality (AR) device comprising:
a plurality of cameras; and
at least one processing device operably coupled to the cameras, the at least one processing device configured to:
for each of the plurality of cameras:
capture an image using the camera and associate the captured image with a camera pose;
determine (i) a first contribution of the captured image for a first virtual view for display on a first display of the AR device and (ii) a second contribution of the captured image for a second virtual view for display on a second display of the AR device; and
determine (i) a first confidence map for the first virtual view based on the camera pose and a position of the camera in relation to a first virtual camera and (ii) a second confidence map for the second virtual view based on the camera pose and the position of the camera in relation to a second virtual camera; and
generate (i) the first virtual view by combining the first contribution using the first confidence map for each of the plurality of cameras and (ii) the second virtual view by combining the second contribution using the second confidence map for each of the plurality of cameras.

9. The VST AR device of claim 8, wherein:
the at least one processing device is further configured, for each of the plurality of cameras, to determine a first parallax map for the first virtual camera and a second parallax map for the second virtual camera by projecting a depth map associated with the captured image onto image planes of the first and second displays; and
the first parallax map is used in generating the first virtual view and the second parallax map is used in generating the second virtual view.

10. The VST AR device of claim 9, wherein:
the first parallax map is used to identify a location of the first contribution in the first virtual view; and
the second parallax map is used to identify a location of the second contribution in the second virtual view.

11. The VST AR device of claim 9, wherein:
the at least one processing device is further configured, for each of the plurality of cameras, to determine (i) a first parallax confidence map associated with the first parallax map for the first virtual view based on the camera pose and the position of the camera in relation to the first virtual camera and (ii) a second parallax confidence map associated with the second parallax map for the second virtual view based on the camera pose and the position of the camera in relation to the second virtual camera; and
the first parallax confidence map is used in generating the first virtual view and the second parallax confidence map is used in generating the second virtual view.

12. The VST AR device of claim 11, wherein:
the first parallax confidence map is used to identify a priority of the first parallax map in generating the first virtual view; and
the second parallax confidence map is used to identify a priority of the second parallax map in generating the second virtual view.

13. The VST AR device of claim 12, wherein a parallax map with a higher confidence than another parallax map is used in a front layer construction of a virtual view in relation to the other parallax map.

14. The VST AR device of claim 8, wherein:
a confidence for the first or second confidence map is determined based on distance and orientation differences between the camera pose and the first or second virtual camera; and
the confidence increases as the distance and orientation differences between the camera and the first or second virtual camera decrease.

15. A non-transitory machine readable medium containing instructions that when executed cause at least one processor to:
for each of a plurality of cameras of a video see-through (VST) augmented reality (AR) device:
capture an image and associate the captured image with a camera pose;
determine (i) a first contribution of the captured image for a first virtual view for display on a first display of the AR device and (ii) a second contribution of the captured image for a second virtual view for display on a second display of the AR device; and
determine (i) a first confidence map for the first virtual view based on the camera pose and a position of the camera in relation to a first virtual camera and (ii) a second confidence map for the second virtual view based on the camera pose and the position of the camera in relation to a second virtual camera; and
generate (i) the first virtual view by combining the first contribution using the first confidence map for each of the plurality of cameras and (ii) the second virtual view by combining the second contribution using the second confidence map for each of the plurality of cameras.

16. The non-transitory machine readable medium of claim 15, further containing instructions that when executed cause the at least one processor, for each of the plurality of cameras, to determine a first parallax map for the first virtual camera and a second parallax map for the second virtual camera by projecting a depth map associated with the captured image onto image planes of the first and second displays;
wherein the first parallax map is used in generating the first virtual view and the second parallax map is used in generating the second virtual view.

17. The non-transitory machine readable medium of claim 16, wherein:
the first parallax map is used to identify a location of the first contribution in the first virtual view; and
the second parallax map is used to identify a location of the second contribution in the second virtual view.

18. The non-transitory machine readable medium of claim 16, further containing instructions that when executed cause the at least one processor, for each of the plurality of cameras, to determine (i) a first parallax confidence map associated with the first parallax map for the first virtual view based on the camera pose and the position of the camera in relation to the first virtual camera and (ii) a second parallax confidence map associated with the second parallax map for the second virtual view based on the camera pose and the position of the camera in relation to the second virtual camera; and wherein the first parallax confidence map is used in generating the first virtual view and the second parallax confidence map is used in generating the second virtual view.

19. The non-transitory machine readable medium of claim 18, wherein:

the first parallax confidence map is used to identify a priority of the first parallax map in generating the first virtual view;

the second parallax confidence map is used to identify a priority of the second parallax map in generating the second virtual view; and a parallax map with a higher confidence than another parallax map is used in a front layer construction of a virtual view in relation to the other parallax map.

20. The non-transitory machine readable medium of claim 15, wherein:

a confidence for the first or second confidence map is determined based on distance and orientation differences between the camera pose and the first or second virtual camera; and the confidence increases as the distance and orientation differences between the camera and the first or second virtual camera decrease.

\* \* \* \* \*